US010626824B2

United States Patent
Kopecek et al.

(10) Patent No.: US 10,626,824 B2
(45) Date of Patent: Apr. 21, 2020

(54) THRUST REVERSER ACTUATING (71) Applicant: Woodward, Inc., Fort Collins, CO (US)

(72) Inventors: Joseph Thomas Kopecek, Santa Clarita, CA (US); Julian Sweet, Pasadena, CA (US)

(73) Assignee: Woodward, Inc., Fort Collins, CO (US)

( * ) Notice: Subject to any disclaimer, the term of this patent is extended or adjusted under 35 U.S.C. 154(b) by 255 days.

(21) Appl. No.: 15/925,435

(22) Filed: Mar. 19, 2018

(65) Prior Publication Data
US 2018/0209377 A1    Jul. 26, 2018

Related U.S. Application Data (62) Division of application No. 15/019,733, filed on Feb. 9, 2016, now Pat. No. 10,054,079.

(51) Int. Cl.
*F02K 1/76* (2006.01)
*F02K 1/62* (2006.01)
(Continued)

(52) U.S. Cl.
CPC .............. *F02K 1/763* (2013.01); *B64D 27/16* (2013.01); *B64D 29/06* (2013.01); *B64D 33/04* (2013.01);
(Continued)

(58) Field of Classification Search
CPC . F02K 1/763; F02K 1/766; F02K 1/60; F02K 1/605; F05D 2270/64; F05D 2270/65
See application file for complete search history.

(56) References Cited

U.S. PATENT DOCUMENTS 3,024,771 A * 3/1962 Criffield .................... F02K 1/76
91/43
4,383,647 A * 5/1983 Woodruff .................. F02K 1/16
239/265.19
(Continued)

FOREIGN PATENT DOCUMENTS

EP        2466101 A2      6/2012
JP       S 63-300097     12/1988
(Continued)

OTHER PUBLICATIONS

International Search Report and Written Opinion of the International Searching Authority issued in International Application No. PCT/US2017/016998 dated Nov. 21, 2017; 12 pages.
(Continued)

*Primary Examiner* — Andrew H Nguyen
(74) *Attorney, Agent, or Firm* — Fish & Richardson P.C.

(57) ABSTRACT

A thrust reverser includes: a thrust-reversing element movable between a stowed position and a deployed position; at least one hydraulic actuator operably coupled to move the thrust-reversing element between the stowed and deployed positions; at least one hydraulic primary lock configured to transition, in response to a first activation pressure, between an engaged state, where movement of the thrust-reversing element is inhibited, and a released state, where movement of the thrust-reversing element is uninhibited; and a directional control unit fluidly coupled to the hydraulic actuator and the hydraulic primary lock, the directional control unit configured to transition from a first stage to a second stage in response to a second activation pressure that is greater than the first activation pressure, and where a transition from the first stage to the second stage by the directional control unit causes the hydraulic actuator to move the thrust-reversing element to the deployed position.

20 Claims, 8 Drawing Sheets

(51) Int. Cl.
*B64D 33/04* (2006.01)
*B64D 27/16* (2006.01)
*F02K 1/60* (2006.01)
*B64D 29/06* (2006.01)

(52) U.S. Cl.
CPC .............. *F02K 1/60* (2013.01); *F02K 1/605* (2013.01); *F02K 1/62* (2013.01); *F02K 1/766* (2013.01); *F05D 2260/57* (2013.01); *F05D 2270/64* (2013.01)

(56) References Cited

U.S. PATENT DOCUMENTS

| | | | |
|---|---|---|---|
| 4,391,409 A * | 7/1983 | Scholz | F02K 1/763 239/265.29 |
| 5,819,527 A | 10/1998 | Fournier | |
| 5,826,823 A | 10/1998 | Lymons et al. | |
| 2013/0061572 A1 | 3/2013 | LeCoq | |
| 2015/0090810 A1 | 4/2015 | Lallement et al. | |
| 2015/0361920 A1 | 12/2015 | Chalaud | |

FOREIGN PATENT DOCUMENTS

| | | |
|---|---|---|
| JP | 2009-236045 | 10/2009 |
| JP | 2012-127344 | 7/2012 |
| JP | 2013-063671 | 4/2013 |
| WO | WO 01/57382 A2 | 8/2001 |

OTHER PUBLICATIONS

International Preliminary Report on Patentability in International Application No. PCT/US2017/016998, dated Aug. 14, 2018, 8 pages.
CA Office Action in Canadian Appln. No. 3,014,053, dated May 1, 2019, 3 pages.
EP Office Action in European Appln. No. 17749765.8, dated Jun. 5, 2019, 3 pages.
JP Office Action in Japanese Appln. No. 2018-541632, dated Aug. 6, 2019, 4 pages (with English translation).
JP Search Report in Japanese Appln. No. 2018-541632, dated Jul. 30, 2019, 21 pages (with English translation).

* cited by examiner

THRUST REVERSER ACTUATING

CROSS-REFERENCE TO RELATED APPLICATIONS

This application is a divisional application of and claims the benefit of priority to U.S. application Ser. No. 15/019,733, filed on Feb. 9, 2016, the contents of which are hereby incorporated by reference.

TECHNICAL FIELD

This specification generally relates to thrust reversers for vehicle turbine engine assemblies, and more particularly to actuation systems for operating such thrust reversers.

BACKGROUND

Thrust reversers are commonly incorporated in aircraft turbine engines. The role of the thrust reverser is to improve the braking capability of the aircraft upon landing by redirecting fluid flow through the engine to provide a counterthrust opposing the direction of travel. Deployment of a thrust reverser at any time other than during landing of the aircraft can seriously disrupt operation of the aircraft, and is therefore highly undesirable. Redundant locking mechanisms are commonly used to prevent unintentional deployment of the thrust reverser. Some conventional designs for redundant locking mechanisms employ hydraulic sequencing techniques to guarantee that all of the locking mechanisms have been unlocked before the actuators controlling deployment of the thrust reverser are activated. Hydraulic sequencing requires each of the redundant locking mechanisms to be in fluid communication with one another, passing hydraulic fluid from one locking mechanism to the next in sequence. While effective, a hydraulic sequencing arrangement requires various support brackets and associated hardware to support the necessary complex network of hydraulic tubing between the locking mechanisms and the corresponding control valve(s).

SUMMARY

In one aspect, an engine assembly includes a nacelle configured to at least partially surround a turbine engine, and a thrust reverser coupled to the nacelle. The thrust reverser includes: a thrust-reversing element movable relative to the nacelle between a stowed position and a deployed position; at least one hydraulic actuator operably coupled to move the thrust-reversing element between the stowed position and the deployed position; at least one hydraulic primary lock configured to transition, in response to a first activation pressure, between an engaged state, where movement of the thrust-reversing element is inhibited, and a released state, where movement of the thrust-reversing element is uninhibited; and a directional control unit fluidly coupled to the hydraulic actuator and the hydraulic primary lock, the directional control unit configured to transition from a first stage to a second stage in response to a second activation pressure that is greater than the first activation pressure, and where a transition from the first stage to the second stage by the directional control unit causes the hydraulic actuator to move the thrust-reversing element to the deployed position.

Another aspect an actuation system for operating an engine thrust reverser including a thrust-reversing element movable between a stowed position and a deployed position. The actuation system includes: at least one hydraulic actuator coupleable to the thrust-reversing element and, when coupled, configured to convey sufficient actuating force to move the thrust-reversing element between the stowed position and the deployed position; at least one hydraulic primary lock coupleable to the thrust-reversing element and, when coupled, configured to transition between an engaged state, where movement of the thrust-reversing element is inhibited, and a released state, where movement of the thrust-reversing element is uninhibited, in response to a first activation pressure; and a directional control unit fluidly coupled to the hydraulic actuator and the hydraulic primary locks, the directional control unit configured to transition from a first stage to a second stage in response to a second activation pressure that is greater than the first activation pressure, and where a transition from the first stage to the second stage by the directional control unit, when the hydraulic actuator is coupled to the thrust-reversing element, causes the hydraulic actuator to convey an actuating force to deploy the thrust-reversing element.

In some examples of the above described aspects, the thrust-reversing element includes a pivotally mounted door.

In some examples of the above described aspects, the hydraulic actuator includes: an actuator housing coupled to the nacelle; an actuator rod extending through the housing and coupled, at a distal end, to the thrust-reversing element, the actuator housing including a piston sealed within the housing and defining first and second fluid chambers of the housing; and first and second fluid ports leading to the respective first and second fluid chambers, each of the first and second fluid ports residing in fluid communication with the directional control unit.

In some examples of the above described aspects, the hydraulic primary lock includes: a lock housing coupled to the nacelle; a spring-biased lock rod extending through the housing; a locking element coupled to a distal end of the lock rod, the locking element engaging a latch of the thrust-reversing element when the hydraulic primary lock is in the engaged state; a piston sealed within a piston chamber of the housing and coupled to a proximal end of the lock rod; and a fluid port leading to the piston chamber and residing in fluid communication with the directional control unit. In some examples, the fluid port residing in fluid communication with the directional control unit is the only fluid port leading to the piston chamber. In some examples, the locking element includes an S-shaped structure mounted to pivot about a center of rotation, and the distal end of the lock rod is connected to a portion of the structure offset from the center of rotation.

In some examples of the above described aspects, the hydraulic primary lock includes: an electronic solenoid plunger; and a spring-biased block movable by the plunger between a first position, where the hydraulic primary lock is prevented from transitioning from the engaged state to the released state, and a second position, where transitioning of the hydraulic primary lock between the engaged state and the released state is uninhibited.

In some examples of the above described aspects, the hydraulic primary lock includes a first hydraulic primary lock, and the thrust reverser further includes a second hydraulic primary lock independently operated by the directional control unit. In some examples, the first hydraulic primary lock and the second hydraulic primary lock are fluidly coupled to the directional control unit in parallel.

In some examples of the above described aspects, the directional control unit includes a spring-biased spool valve configured to receive pressurized fluid from a pressure source and selectively convey the pressurized fluid to an extend fluid port and a retract fluid port of the hydraulic actuator based on a current stage of the directional control unit, such that the pressurized fluid is conveyed to the extend fluid port of the hydraulic actuator only when the directional control unit is in the second stage. In some examples, the spool valve includes an elongated shaft having a spring shoe at one end, a piston member at an opposite end, and a land residing between the ends of the shaft. In some examples, the spool valve resides in a valve case including: a spring chamber receiving a biasing spring seated on the spring shoe of the spool valve; an actuator fluid chamber in fluid communication with the extend fluid port of the hydraulic actuator; and a piston chamber receiving the piston member of the spool valve, the piston chamber including pilot valve inlet port for receiving pressurized fluid from the pressure source and directing a hydraulic pressure force against the piston member, the hydraulic pressure force opposing a spring force of the biasing spring. In some examples, the spool valve is movable within the valve case when the hydraulic pressure force overcomes the spring force at the second activation pressure. In some examples, the directional control unit further includes a solenoid valve configured to, in response to a control signal, simultaneously convey pressurized fluid from the pressure source to the pilot valve inlet port and the hydraulic primary locks. In some examples, the directional control unit further includes a flow restriction residing on a flow path leading to the pilot valve inlet port.

In yet another aspect, a method of operating an aircraft engine thrust reverser including a thrust-reversing element movable between a stowed position and a deployed position, the method including: conveying, with a directional control unit, a first activation pressure to at least one hydraulic primary lock to transition the hydraulic primary lock from an engaged state to a released state; providing a second activation pressure greater than the first activation pressure to the directional control unit to transition the directional control unit from a first stage to a second stage; and in response to transitioning the directional control unit to the second stage, operating at least one hydraulic actuator to move the thrust-reversing element to the deployed position.

In some examples, the method further includes applying the first activation pressure to an internal spool valve of the directional control unit, and the first activation pressure is insufficient to overcome a spring force applied to the spool valve by a biasing spring. In some examples, the method still further includes, prior to applying the first activation pressure to the internal spool valve, operating a solenoid valve of the directional control unit to place a valve inlet port of the directional control unit in fluid communication with a pilot valve inlet port of the directional control unit. In some examples, providing the second activation pressure to the directional control unit including applying the second activation pressure to the internal spool valve, and the second activation pressure is sufficient to overcome the spring force. In some examples, providing the second activation pressure to the spool valve includes routing pressurized fluid at the second activation through a flow constriction to retard the buildup of hydraulic pressure directed against the spring force.

In some examples, conveying the first activation pressure to at least one hydraulic primary lock includes simultaneously conveying the first activation pressure to a plurality of redundant hydraulic primary locks, with each of the plurality of locks being fluidly coupled to the directional control unit in parallel.

In some examples, operating the hydraulic actuator includes conveying, with the directional control unit, pressurized fluid at the second activation pressure to an extend fluid port of the hydraulic actuator. In some examples, operating the hydraulic actuator further includes: receiving, with the directional control unit, fluid from a retract fluid port of the hydraulic actuator; and recirculating, with the directional control unit, the received fluid to the extend fluid port of the hydraulic actuator.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Various elements of the drawings may be exaggerated or illustrated schematically to better show the features, process steps, and results. Like reference numbers and designations in the various drawings may indicate like elements.

DETAILED DESCRIPTION

The thrust-reverser actuation systems described herein are appropriately configured to provide a pressure-sequenced arrangement for assuring that a plurality of redundant hydraulic locking mechanisms are unlocked before the thrust reverser is deployed by one or more actuators. In particular, the pressure-sequenced techniques of the present disclosure involve redundant hydraulic locking mechanisms that are responsive to a lower activation pressure than other system components (e.g., the hydraulic actuators). As will become apparent from the discussion below, this pressure-sequenced arrangement is significantly different from conventional hydraulic sequencing designs, which require each primary locking element to act as a sequencing valve for porting activation pressure to the next downstream element of the sequence. Indeed, the pressure-sequenced actuation systems of the present disclosure advantageously provide a comparatively simplified hydraulic architecture, having reduced weight, cost and complexity, by eliminating the need to fluidly connect the locking mechanisms in sequence with one another and the actuators.

Figure 1A:
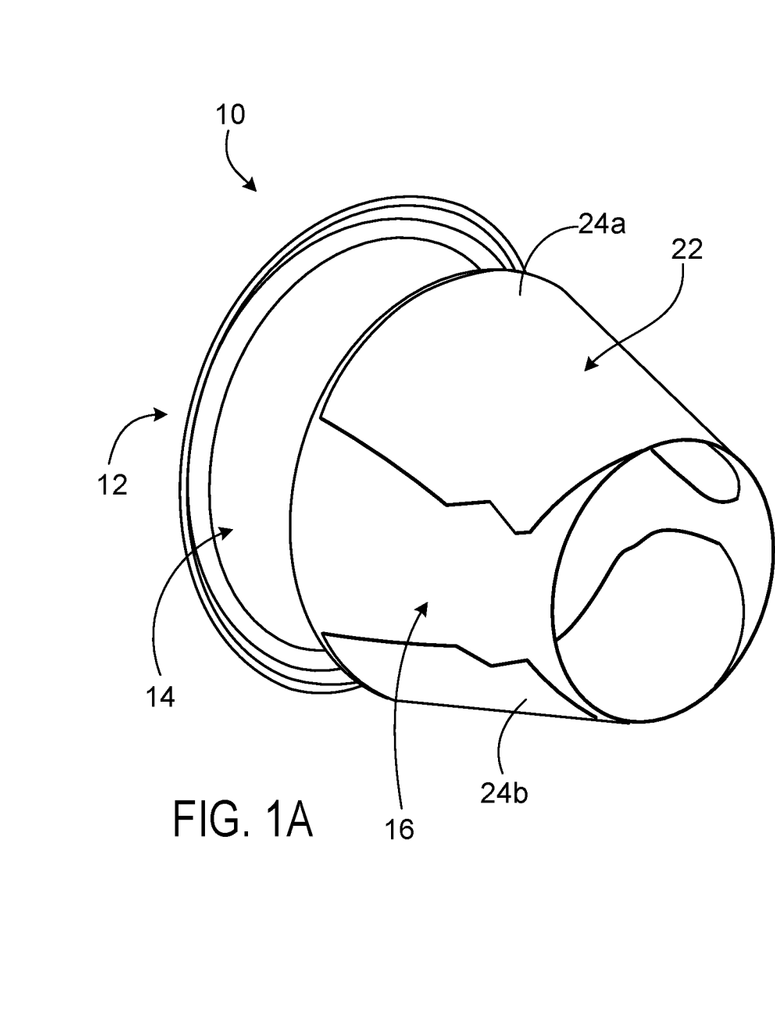
FIG. 1A is a rear perspective view illustrating a portion of an exemplary engine assembly with the doors of a thrust reverser in a stowed position.
Figure 1B:
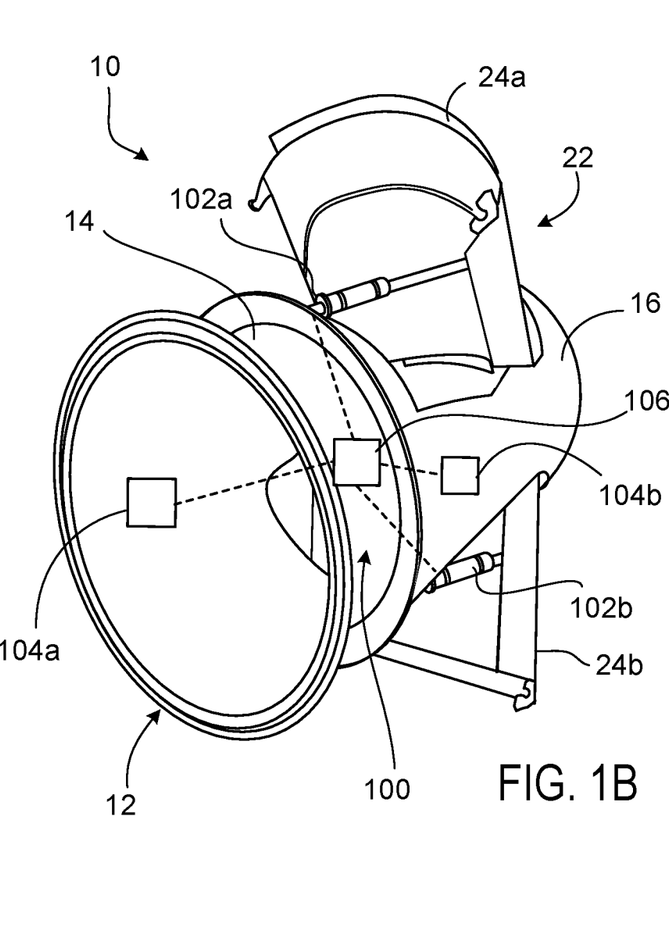
FIG. 1B is a front perspective view illustrating the exemplary engine assembly of FIG. 1A with the doors of the thrust reverser in a deployed position.

FIGS. 1A and 1B illustrate an example engine assembly 10 in accordance with one or more embodiments of the present disclosure. In some embodiments, the engine assembly 10 may be incorporated in a powered vehicle (not shown), such as an aircraft. In this example, the engine assembly 10 includes a nacelle 12 supporting a thrust reverser 22. As shown, the nacelle 12 is an annular structure coupleable to the vehicle's frame for housing a turbine engine (e.g., a turbojet or turbofan engine) powering the vehicle. In this example, the nacelle 12 includes a front housing 14 and a rear housing 16. The front and rear housings 14,16 are tubular, frusto-conical components, with the rear housing 16 being mounted co-axially with the front housing 14. The front housing 14 is designed to receive the turbine engine, and the rear housing 16 is designed to support the thrust reverser 22. The thrust reverser 22 is a pivoting-door type arrangement, a clamshell configuration in particular. However, other suitable types of thrust reversers (e.g., target door or petal door type thrust reversers) may also be compatible with the actuation systems described herein.

In this example, the thrust reverser 22 includes a pair of thrust-reversing elements 24a,24b and an actuation system 100 (see FIG. 1B). The thrust-reversing elements 24a,24b are shown in this example as bulkheads or "doors" pivotally mounted to the rear housing 16 of the nacelle 12. The doors 24a,24b are shown in a stowed position, pivoted inward towards the nacelle 12, in FIG. 1A and in a deployed position, pivoted outward away from the nacelle 12, in FIG. 1B. The actuation system 100 is appropriately configured to control operation of the doors 24a,24b, regulating movement between the stowed and deployed positions—e.g., based on one or more control signals. In this example, the actuation system 100 includes hydraulic actuators 102a, 102b, hydraulic primary locks 104a,104b, and a directional control unit ("DCU") 106. Each of the hydraulic actuators 102a,102b is operably coupled to move a respective one of the doors 24a,24b between the stowed and deployed positions. As discussed below, the hydraulic actuators 102a,102b are designed to provide linear movement, pushing the doors 24a,24b outward from the stowed position to the deployed position and pulling the doors 24a,24b inward from the deployed position to the stowed position. Each of the hydraulic primary locks 104a,104b are engageable with both of the doors 24a,24b, such that either of the primary locks can independently prevent the unintentional deployment of both doors if the other primary lock becomes inoperable (see e.g., FIG. 3 and associated discussion). Thus, in this example, the hydraulic primary locks 104a,104b are provided in a redundant arrangement. In some other examples, the primary locks may be used to engage each door individually. As discussed below, the hydraulic locks 104a,104b are configured to transition between an engaged state, where movement (e.g., deployment) of the doors 24a,24b is inhibited, and a released state, where movement of the doors 24a,24b is uninhibited. In some examples, the hydraulic primary locks 104a,104b are designed to transition from the engaged state to the released state in response to a specified first activation pressure.

The DCU 106 is fluidly coupled to each of the hydraulic actuators 102a,102b and each of the hydraulic primary locks 104a,104b—though, notably, these other system components are fluidically isolated from one another or mutually coupled to the DCU in parallel (as compared to a hydraulically sequenced actuation system featuring components that are linked in series by tubing). The DCU 106 receives pressurized fluid from a pressure source (e.g., pressure source 210 of FIGS. 2A-2F) and selectively ports the fluid to the hydraulic actuators 102a,102b and hydraulic primary locks 104a,104b to operate these components via hydraulic pressure. As discussed below, the DCU 106 is configured to transition between a first stage and a second stage in response to a second specified activation pressure. In the second stage, the DCU 106 ports high pressure fluid to the hydraulic actuators 102a,102b to deploy the thrust reverser doors 24a,24b. In some examples, the second activation pressure that triggers deployment of the doors 24a,24b is greater than the first activation pressure that triggers the release of the hydraulic primary locks 104a,104b.

FIGS. 2A-2F illustrate an example actuation system 200, such as may be used in conjunction with the example engine assembly 10 shown and described above with respect to FIG. 1. Thus, similar to the actuation system 100, actuation system 200 includes first and second actuators 202a,202b, first and second redundant hydraulic primary locks 204a, 204b, and a DCU 206. The actuation system further includes an isolation valve 208, a pressure source 210 and a fluid reservoir 212. The pressure source 210 may include one or more suitable pressure regulating apparatuses (e.g. a pump) for controlling (e.g., increasing) the pressure of a working fluid (e.g., a hydraulic fluid). The fluid reservoir 212 may include one or more vessels for receiving working fluid passed through various components of the actuating system, containing the working fluid, and supplying the working fluid to the pressure source 210.

In this example, the isolation valve 208 is a three-port pressure regulating component including a high pressure port 214 fluidly coupled to the pressure source 210, a low pressure port 216 fluidly coupled to the fluid reservoir 212, and a service port 218 fluidly coupled to the DCU 206. The isolation valve 208 further includes a solenoid 220 for selectively (e.g., based on a control signal) placing the service port 218 in fluid communication with the high pressure port 214 and the low pressure port 216. When the solenoid 220 is in an ON condition, the service port 218 is placed in fluid communication with the high pressure port 214; and when the solenoid 220 is in an OFF condition, the service port 218 is placed in fluid communication with the low pressure port 216.

The DCU 206 includes a housing 222 including various ports and components for routing fluid to and from the first and second actuators 202a,202b and the first and second hydraulic primary locks 204a,204b. In this example, the housing 222 includes a main low pressure port 224 fluidly coupled to the fluid reservoir 212, a valve inlet port 226 fluidly coupled to the service port 218 of the isolation valve 208, a locking fluid port 228 fluidly coupled to the hydraulic primary locks 204a,204b, and actuator retract and extend fluid ports 229,230, each of which is fluidly coupled to the first and second actuators 202a,202b. The DCU 206 further includes a spool valve 232 situated within the interior of the housing 222. The spool valve 232 includes an elongated shaft 234 having a spring shoe 236 at one end of its length, a piston member 238 at the opposite end, and a land 240 between the two ends.

The interior of the housing 222 defines a valve case 241 receiving the spool valve 232. The valve case 241 includes a spring chamber 242, an actuator fluid chamber 244, and a piston chamber 245. A biasing spring 246 residing in the spring chamber 242 is seated against the spring shoe 236 to urge the spool valve 232 "downward." The spring chamber 242 includes a low pressure port 247 fluidly coupled to the DCU's main low pressure port 224, such that, during use, the spring chamber 242 remains at reservoir pressure. The actuator fluid chamber 244 is in fluid communication with the actuator extend fluid port 230. As discussed below, movement of the spool valve 232 within the valve case 241 regulates fluid flow to the actuator fluid chamber 244. The piston chamber 245 receives the spool valve's piston member 238, which is sealed against the interior walls of the chamber, and includes a pilot valve inlet port 248 for effecting a hydraulic pressure force against the piston member. A pilot valve restriction 249 mitigates fluid flow to the pilot valve inlet port 248.

As noted above, the spool valve 232 is movable within the valve case 241 between a lowered position (see e.g., FIGS. 2A-2C and 2E-2F)—the first stage of the DCU 206—and a raised position (see e.g., FIG. 2D)—the second stage of the DCU 206. When the spool valve 232 is in the lowered position, the force of the biasing spring 246 presses the piston member 238 against the bottom edge of the piston chamber 245. In this position, the land 240 interfaces with the interior wall of the valve case 241 to place the actuator fluid chamber 244 in fluid communication with the low pressure port 247 of the spring chamber 242. When the spool valve 232 is in the raised position, the force of the biasing spring 246 is overcome by the pressure force of hydraulic fluid ported to the pilot valve inlet port 248 leading to the piston chamber 245. The hydraulic pressure force urges the spool valve 232 "upwards" into the raised position against the spring force. In this position, the land 240 interfaces with the interior wall of the valve case 241 to place the actuator fluid chamber 244 in fluid communication with the valve inlet port 226.

The valve case 241 further includes a pair of aligned fluid ports 250a,250b that convey fluid from the valve inlet port 226, through the valve case 241, to a downstream flow juncture 251 within the DCU's housing 222. The flow juncture 251 is in fluid communication with both the actuator retract fluid port 229 and a fluid inlet port 253 of a solenoid valve 252. The solenoid valve 252 is a three-port valve designed to regulate fluid flow through the various ports and flow paths of DCU 206. The solenoid valve 252 includes the fluid inlet port 253 fluidly coupled to receive fluid from the valve inlet port 226 via the flow juncture 251 (as discussed above), a low pressure port 254 fluidly coupled to the DCU's main low pressure port 224, and a fluid outlet port 255 that conveys fluid to a downstream flow juncture 256 within the DCU's housing 222. The flow juncture 256 is in fluid communication with both the pilot valve inlet port 248 and the locking fluid port 228. The solenoid valve 252 is designed to selectively (e.g., based on a control signal) place the fluid outlet port 255 in fluid communication with either of the low pressure port 254 or the fluid inlet port 253. When the solenoid valve 252 is in an OFF condition, the fluid outlet port 255 is placed in fluid communication with the low pressure port 254, such that the flow juncture 256 and its associated downstream ports (i.e., the pilot valve inlet port 248 and the locking fluid port 228) are fluidly coupled with the DCU's main low pressure port 224. When the solenoid valve 252 is in an ON condition, the fluid outlet port 255 is placed in fluid communication with the fluid inlet port 253, such that the flow juncture 256 and its associated downstream ports are fluidly coupled with the DCU's valve inlet port 226.

The first and second actuators 202a,202b are designed to move the respective doors (e.g., doors 24a,24b shown in FIGS. 1A and 1B) of a thrust reverser (e.g., thrust reverser 22 of FIGS. 1A and 1B) between a stowed position and a deployed position. In this example, the first and second actuators 202a,202b are substantially identical both structurally and functionally, and will therefore be described in unison. Each of the first and second actuators 202a,202b includes a housing 260 including a coupler 262 and an interior cavity 264. The coupler 262 provides a fixed connection between the actuator and the nacelle (e.g., nacelle 12) of the thrust reverser. The actuator's interior cavity 264 receives an elongated actuator rod 266 including a piston member 268 at a proximal end and a coupler 270 at an opposite distal end. The coupler 270 attaches the actuator rod 266 to the door of the thrust reverser, such that the door moves (e.g., pivots) in response to movement by the actuator rod 266. The piston member 268 seals against the wall of the interior cavity 264, bifurcating the cavity into an extend fluid chamber 272 and a retract fluid chamber 274. The actuator housing 260 further includes an extend fluid port 276 leading to the extend fluid chamber 272, a retract fluid port 278 leading to the retract fluid chamber 274, and a low pressure port 280 fluidly coupled to the fluid reservoir 212. The extend fluid port 276 is fluidly coupled to the DCU's actuator fluid extend port 230 and the retract fluid port 278 is fluidly coupled to the DCU's actuator fluid retract port 229. The actuator rod 266 is movable within the interior cavity 264 of the housing 260. For example, the actuator rod 266 is movable in response to unbalanced fluid pressure force between the extend and retract fluid chambers 272,274 acting on the piston member 268. When hydraulic pressure force in the extend fluid chamber 272 is greater than the fluid pressure force in the retract fluid chamber 274, the actuator rod 266 moves "downward" to deploy the attached thrust reverser door. When hydraulic pressure force in the retract fluid 274 is greater, the actuator rod 266 moves "upward" to stow the thrust reverser door. In this example, the first and second actuators 202a,202b are "unbalanced," because the piston area exposed to fluid pressure in the extend fluid chamber 272 is greater than the piston area in the retract fluid chamber 274 (due to the presence of the rod extending through the retract fluid chamber). The greater piston area creates a greater hydraulic force output. As such, when the extend and retract fluid chambers 272,274 are at equal fluid pressure, the actuator rod 266 will be urged downward to deploy the thrust reverser door due to the greater force output of the retract fluid chamber 272.

In this example, each of the first and second actuators 202a,20b further includes an actuator lock 269 mounted in the interior cavity 264 of the housing 260. The actuator lock 269 is designed to regulate movement of the actuator rod 266 within the housing 260. In particular, when the actuator lock 269 is engaged with the piston 268, movement of the actuator rod 266 in the downward direction to deploy the thrust reverser door is inhibited. In some examples, the actuator lock 269 may include a spring-biased, pressure-release mechanism that holds the lock in engagement with the piston 268 in response to a predetermined pressure differential. Here, the actuator lock 269 is in fluid communication with the extend fluid port 276 and the low pressure port 280. Accordingly, the actuator lock 269 is disengaged from the piston 268 when the fluid pressure at the extend fluid port 276 surpasses a predetermined setpoint. The actuator lock 269 provides a secondary level of protection against inadvertent in-flight deployment of the thrust reverser doors.

The first and second hydraulic primary locks 204a,204b provide the main level of protection against accidental deployment of the thrust reverser doors by the first and second actuators 202a,202b. As indicated above, each of the first and second hydraulic primary locks 204a,204b is associated with both of the doors to provide a redundant locking system. That is, each of the first and second hydraulic primary locks 204a,204b is appropriately configured to transition between an engaged state, where movement (e.g., deployment) of the thrust reverser doors is inhibited (if not completely prevented), and a release state, where movement of the thrust reverser doors is uninhibited.

Figure 3:
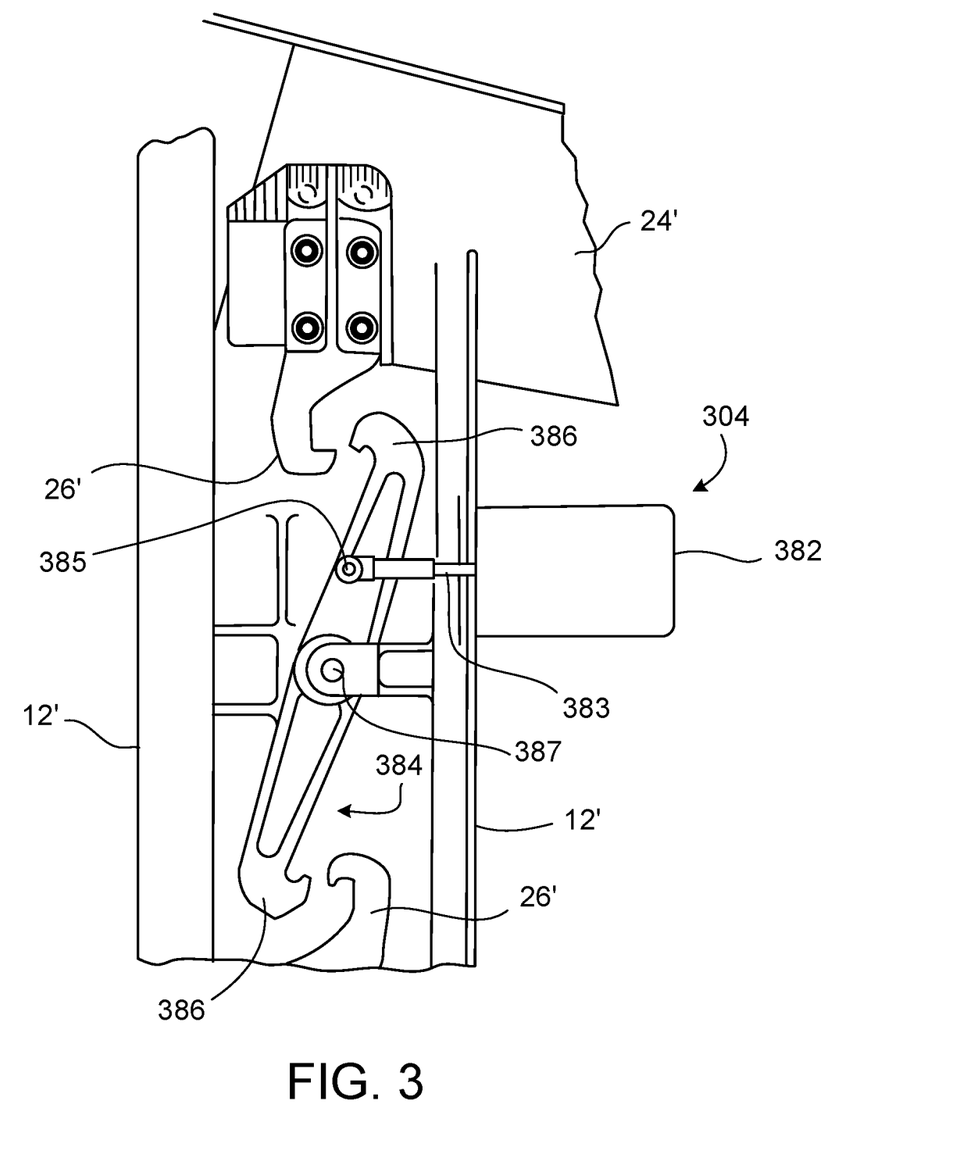
FIG. 3 is a side view of an example S-hook locking element and a pivoting door latch of a thrust reverser.

Turning briefly to FIG. 3, an example hydraulic primary lock 304 includes a lock housing 382, a lock rod 383, and a locking element 384. The lock housing 382 is coupled to a portion of the nacelle 12' and receives a portion of the lock rod 383. The lock rod 383 includes a coupler 385 connecting the lock rod to a portion of the locking element 384, and is movable relative to the lock housing in response to an activation pressure (as discussed below). Movement of the lock rod 383 causes corresponding movement of the locking element 384. In this example, the locking element 384 is an S-hook structure having opposing hooks 386 designed to engage the respective latches 26' of two opposing thrust reverser doors 24'. Of course, other embodiments may use single hooks (instead of S-hooks) engaging one door only (e.g., in an implementation involving a petal-door type thrust reverser). The locking element 384 is rotatably mounted to the nacelle 12' at a stationary center of rotation (COR) 387. The connection between the lock rod 383 and the locking element 384 is offset from the COR 387, such that movement of the lock rod 383 in and out of the housing 382 causes the hooks 386 of the locking element 384 to rotate towards or away from the door latches 26'. The hydraulic primary lock 304 is in an engaged state when the hooks 386 interface with the latches 26' to prevent deployment of the doors 24', and in a released state when the hooks 386 are disengaged from the latches 26', which allows the doors 24' to move freely (e.g., in response to movement by the respective hydraulic actuators).

Referring back to FIGS. 2A-2F, similar to the example of FIG. 3, the first hydraulic primary lock 204a includes a housing 282, a lock rod 283, and a locking element 284 attached to a distal end of the lock rod 283 by a coupler 285. The structure and function of these components are similar to the example described above. In this example, the proximal end of the lock rod 283 includes a piston member 288 sealed in a piston chamber 289 of the lock housing 282, which further includes a fluid inlet port 290 leading to the piston chamber 289. The fluid inlet port 290 is fluidly coupled to the DCU's locking fluid port 228. A biasing spring 291 situated between the lock housing 282 and a spring seat 292 located on the lock rod 283 urges the lock rod "downward" relative to the housing, such that the hooks 286 of the locking element 284 are rotated towards the door latches 26". When pressurized fluid is received in the piston chamber 289 via the fluid inlet port 290, the hydraulic pressure force acting against the piston member 288 overcomes the force of the biasing spring 291 and causes the lock rod 283 to move "upward" relative to the housing, such that the hooks 286 are rotated away from the door latches 26".

The second hydraulic primary lock 204b is similar to the first, including a housing 282, a lock rod 283, and a locking element 284 (as well as the other associated elements described above). However, the second hydraulic primary lock 204b further includes an integrated second-level electronic locking mechanism. The electronic locking mechanism includes a supplementary housing 293 integrated with the housing 282, a solenoid plunger 294 mounted to the supplementary housing, a locking block 295 movable by the solenoid plunger, a biasing spring 296 acting on the locking block, and a locking flange 297 integrated with the lock rod 283. The locking block 295 is mounted to move perpendicularly to the elongated lock rod 283 between a first position (see FIGS. 2A and 2F), where the block is extended to engage the locking flange 297 to prevent upward movement of the lock rod 283, and a second position (see FIGS. 2B-2E), where the block is retracted to disengage from the locking flange to allow upward movement of the lock rod 283. When the locking block 295 is in the first position, the second hydraulic primary lock 204b is prevented from transitioning from the engaged state to the released state (by the operations discussed above); and the transition is uninhibited when the locking block 295 is in the second position. The solenoid plunger 294 regulates movement of the locking block 295 through the supplementary housing 293—e.g., in response to a control signal. When the solenoid plunger 294 is in an OFF condition, the force of the biasing spring 296 urges the locking block 295 into the first position, and when the solenoid plunger 294 is in an ON condition, the locking block 295 is pulled against the force of the biasing spring to move the block to the second position.

Figure 2A:
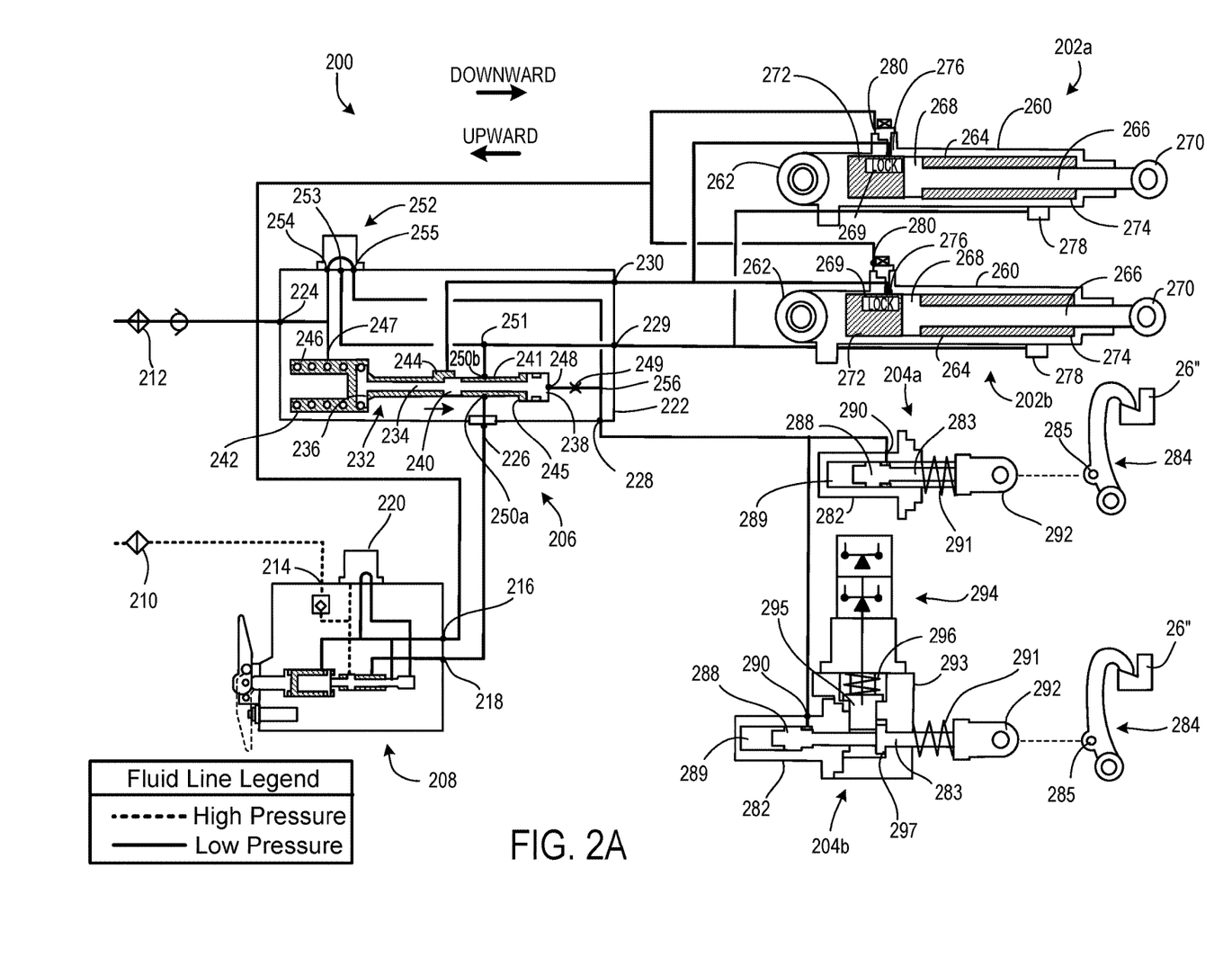
FIGS. 2A-2F are progressive diagrams illustrating exemplary operation of a pressure-sequenced thrust-reverser actuation system during deployment and stowing of the thrust reverser doors.

The pressure-sequenced operation of the actuation system 200 will be described with continued reference to FIGS. 2A-2F. FIGS. 2A-2E depict a sequence for deploying the doors of a thrust reverser, and FIG. 2F depicts a sequence for stowing the thrust reverser doors. FIG. 2A illustrates the actuation system 200 in an initial state, with the thrust reverser doors stowed, and the door latches 26" engaged with the hooks 286 of the locking elements 284. In this initial state, the isolation valve's solenoid 220, the DCU's solenoid valve 252, and the second hydraulic primary lock's solenoid plunger 294 are de-energized and in the OFF condition. Accordingly, the DCU 206, the first and second hydraulic actuators 202a,202b, and the first and second hydraulic primary locks 204a,204b are all in equilibrium with the pressure of the fluid reservoir 212. While in low-pressure equilibrium, the spool valve 232 of the DCU 206 is held in the lowered position by the biasing spring 246.

Figure 2B:
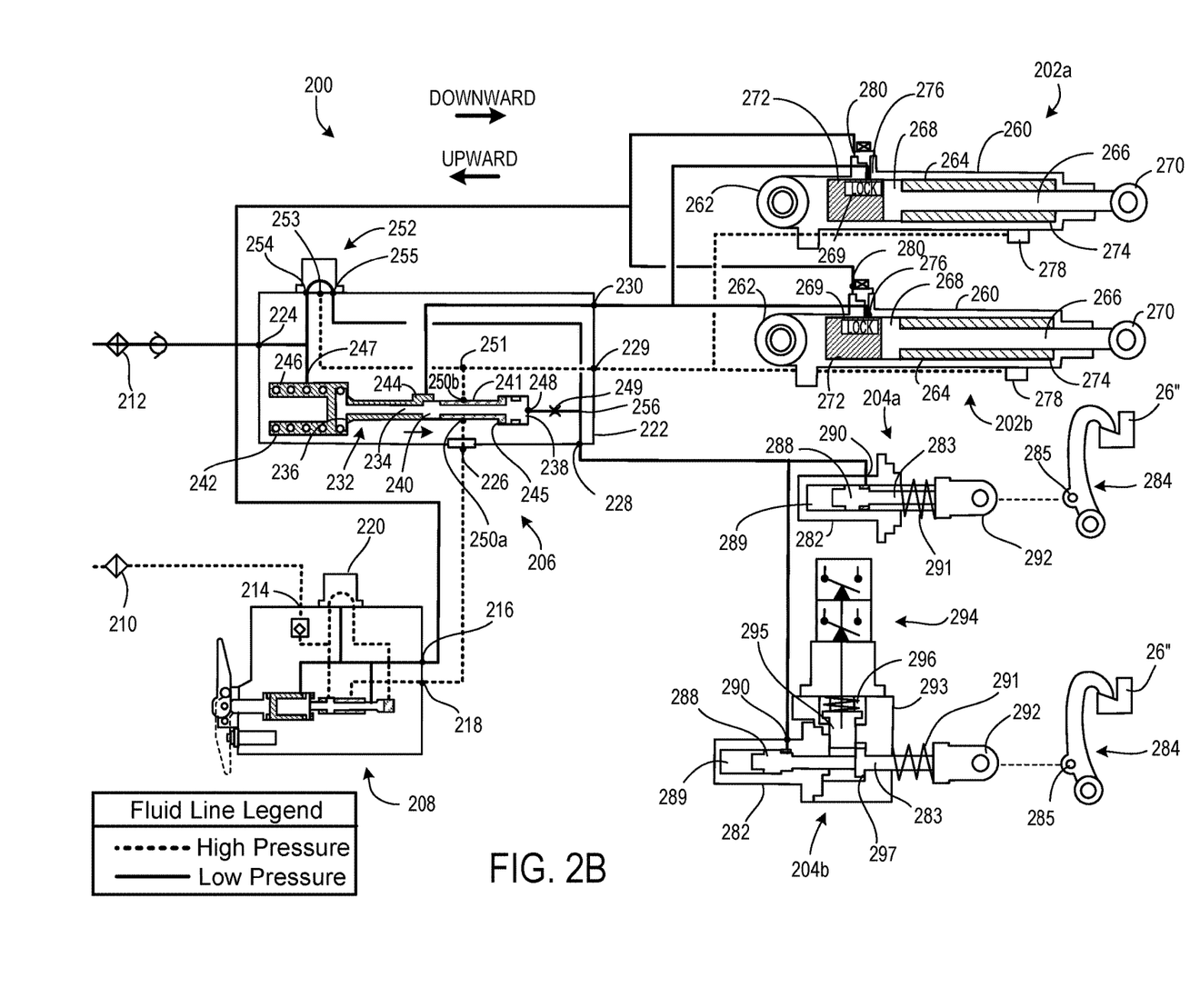

FIG. 2B illustrates the actuation system 200 at a first deploy stage—where the thrust reverser doors are pulled inward by the first and second hydraulic actuators 202a, 202b in preparation for releasing the first and second hydraulic locks 204a,204b. Here, the isolation valve's solenoid 220 is placed in the ON condition, moving the service port 218 into fluid communication with the high pressure port 214 fluidly coupled to the pressure source 210. Pressurized fluid from the pressure source 210 is routed from the isolation valve's service port 218 to the DCU's valve inlet port 226, through the aligned fluid ports 250a,250b of the valve case 241 to the flow juncture 251, and from the flow juncture 251 to the fluid inlet port 253 of the solenoid valve 252 and the retract fluid chambers 274 of the first and second hydraulic actuators 202a,202b (via the DCU's actuator retract fluid port 229 and the corresponding retract fluid ports 278). In this "overstow" state, the DCU's solenoid valve 252 remains in the OFF condition, which prevents the flow of pressurized fluid from reaching its fluid outlet port 255. As such, the spool valve 232 of the DCU 206 remains in the lowered position, and the first and second hydraulic primary locks 204a,204b remain in the engaged state. Note, however, that the solenoid plunger 294 of the second hydraulic primary lock 204b is also placed in the ON condition, which disengages the locking block 295 from the locking flange 297 on the lock rod 283.

Figure 2C:
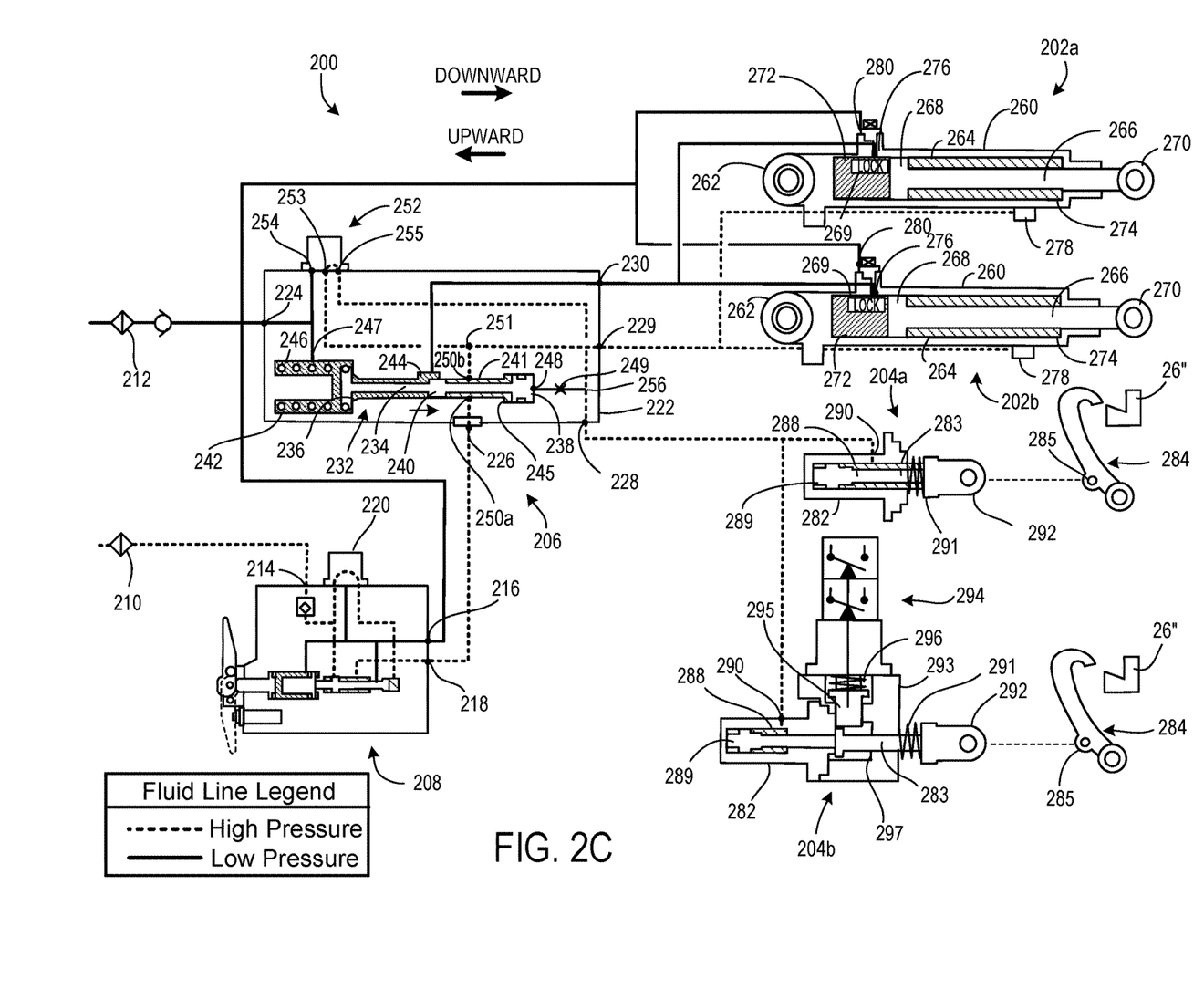

FIG. 2C illustrates the actuation system 200 at a second deploy stage—where the first and second hydraulic primary locks 204a,204b are transitioned from the engaged state to the released state. Here, the DCU's solenoid valve 252 is placed in the ON condition, placing its fluid inlet port 253—now receiving pressurized fluid from the pressure source 210—in fluid communication with the fluid outlet port 255. Pressurized fluid is now routed from the fluid outlet port 255 of the solenoid valve 252 to the flow juncture 256, and to the pilot valve inlet port 248 and the piston chambers 289 of the first and second primary hydraulic locks 204a,204b via their respective fluid inlet ports 290. When sufficient pressure builds in the piston chambers 289, the force of the biasing springs 291 is overcome, such that the lock rods 283 are raised upwards, pulling the hooks 286 of the locking elements 284 away from the door latches 26". The pressure at which the hydraulic force acting on the piston members 288 exceeds the force of the biasing springs 291 is the "activation pressure" of the first and second hydraulic locks 204a,204b—referred to herein as the "first activation pressure" of the actuation system 200. This first activation pressure is a characteristic of the locks, and can be selectively established at a predetermined set point by appropriately tuning the locks. For example, various features of the piston members 288, piston chambers 289, and biasing springs 291 may be adjusted to achieve a desired first activation pressure. In some examples, the first activation pressure for releasing the first and second hydraulic locks 204a,204 may be about 1000 psi (e.g., between about 600 and about 1400 psi). Notably, although pressurized fluid has been ported to the pilot valve inlet port 248 at this stage, the first activation pressure is not sufficient to move the spool valve 232 to the raised condition.

Figure 2D:
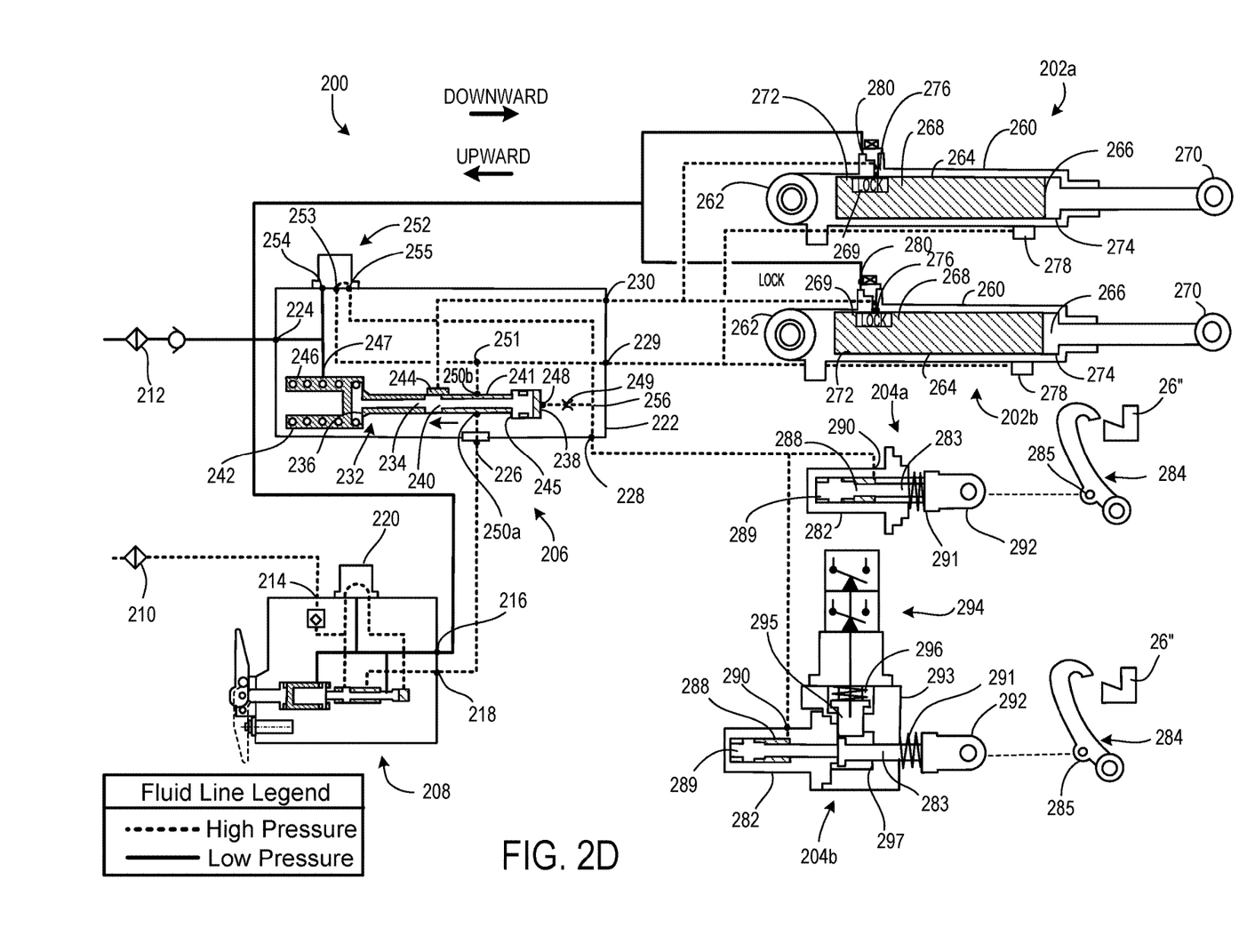

FIG. 2D illustrates the actuation system 200 at a third deploy stage—where the first and second hydraulic actuators 202a,202b are moved from the stowed position to the deployed position. Here, the DCU's solenoid valve 252, and the second hydraulic primary lock's solenoid plunger 294 remain in the ON condition, and pressure continues to build in the activation system 200 beyond the first activation pressure. When sufficient pressure builds at the pilot valve inlet port 248, the upward hydraulic pressure force exerted against the spool valve's piston member 238 overcomes the downward force of the biasing spring 246 and the spool valve 232 is moved to the raised position. The pressure at which the hydraulic force acting on the piston member 238 exceeds the force of the biasing spring 246 is the "activation pressure" of the DCU 206—referred to herein as the "second activation pressure" of the actuation system 200. This second activation pressure is a characteristic of DCU 206, and can be selectively established at a predetermined set point. For example, various features of the piston member 238, the piston chamber 245, and the biasing spring 246 may be adjusted to achieve a desired second activation pressure. In some examples, the second activation pressure may be about 2000 psi (e.g., between about 1700 and about 2500 psi). Furthermore, the DCU 206 may include the optional pilot valve restriction 249, which mitigates fluid flow to the pilot valve inlet port 248 and retards the buildup of pressure at the pilot valve inlet port 248, which creates a delay in the response time of the spool valve 232. With the spool valve 232 in the raised position, the actuator fluid chamber 244 is placed in fluid communication with the valve inlet port 226, and therefore receives the flow of pressurized fluid. The pressurized fluid is routed from the actuator fluid chamber 244 to the DCU's actuator extend port 230 and to the extend fluid chambers 272 of the first and second hydraulic actuators 202a,202b via their respective extend fluid ports 276. In response to fluid pressure at the fluid extend ports 276 reaching the predetermined setpoint, the actuator locks 269 are released from engagement with the actuator rod piston 268, allowing the actuator rods 266 to move freely within the interior cavities 264 of the actuator housings 260. At equal pressure between the extend and retract fluid chambers 272,274, the greater force output of the extend fluid chambers 272 causes the actuator rods 266 to move downwards through the actuator housings 260 to deploy the thrust reverser doors. As the actuator rods 266 move the piston members 258 force fluid out of the retract fluid chambers 274 and back to the DCU 206. This fluid is recirculated through the DCU 206 and ported back to the extend fluid chambers 272. This recirculation arrangement reduces the amount of tubing required, as well as the hydraulic fluid demand on the pressure source 210.

As noted above, embodiments of the present disclosure are based on a realization that setting the first activation pressure required to disengage the hydraulic primary locks lower than the second activation pressure required to unlock and deploy the hydraulic actuators produces a pressure-sequenced actuation system that requires significantly less supporting infrastructure than a hydraulically sequenced configuration where various system components are tethered to one another by tubing.

Figure 2E:
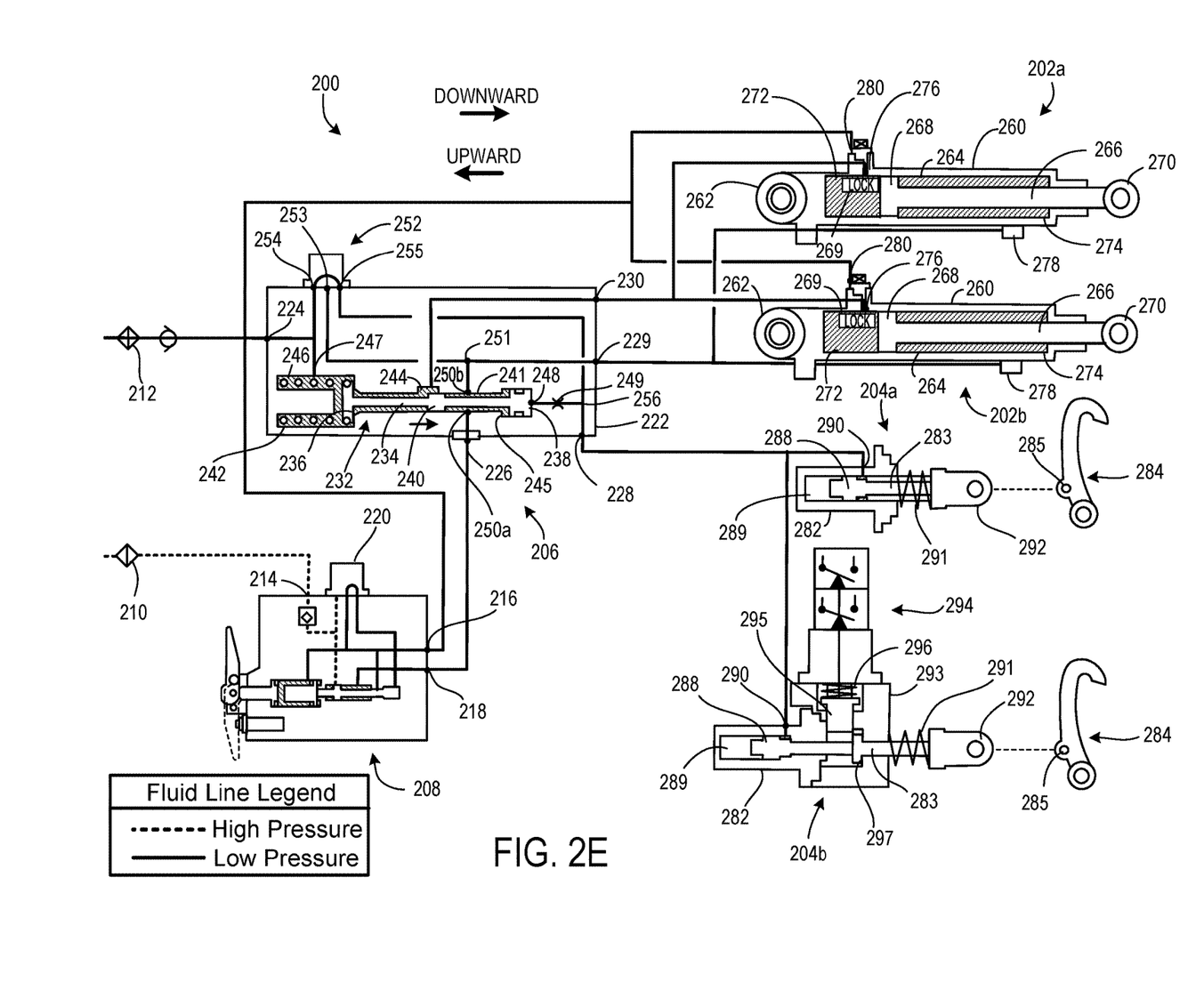
Figure 2F:
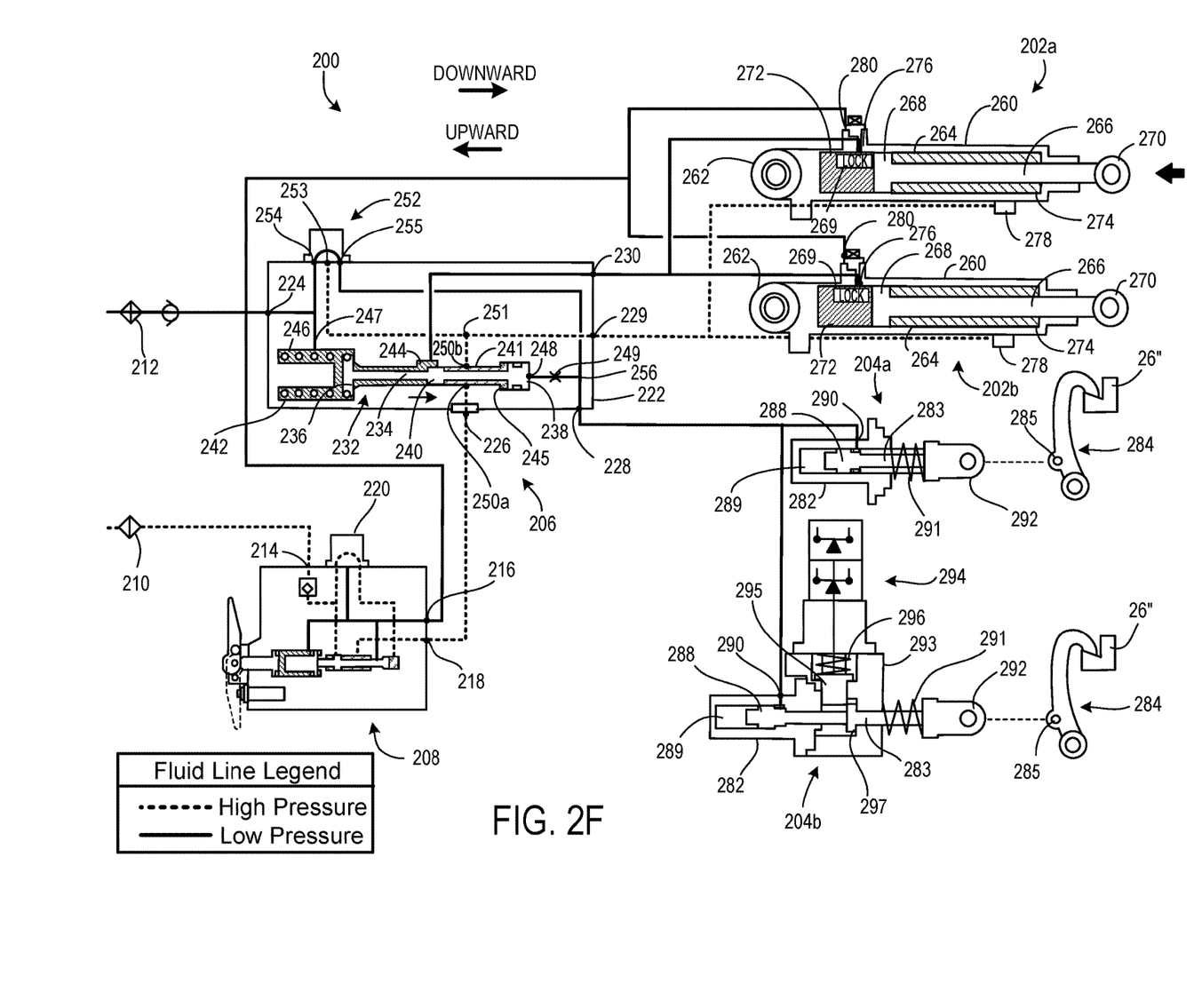

FIG. 2E illustrates the example actuation system 200 at a fully deployed stage. Here, the solenoid 220 of the isolation valve 208 is placed in the OFF condition, causing the DCU 206, the first and second hydraulic actuators 202a,202b, and the first and second hydraulic primary locks 204a,204b to again establish a low-pressure equilibrium with the pressure of the fluid reservoir 212. In this example, the DCU's solenoid valve 252 remains in an ON condition to prevent a potential failure (e.g., a false ON) of the isolation valve 208 from causing an inadvertent stow action of the thrust reverser while deployed. At the low-pressure equilibrium, the biasing springs 291 of the first and second hydraulic primary locks 204a,204b force the lock rods 283, and the associated locking elements 284, back to a lowered position where they can readily re-engage with the door latches 26" of the thrust reverser doors at the stowed stage of FIG. 2F. Although the first and second hydraulic actuators 202a,202b are also placed at low-pressure equilibrium, the thrust reverser doors remain deployed due to the aerodynamic loads acting thereon. FIG. 2F illustrates the actuation system 200 at a stowed stage, where the thrust reverser doors are retracted and the door latches 26" are re-engaged with the hooks 286 of the locking elements 284. To achieve this stowed stage, the DCU's solenoid valve 252 and the second hydraulic primary lock's solenoid plunger 294 are placed in the OFF condition, re-establishing the conditions of the first deploy stage discussed above with reference to FIG. 2B. At this stage, pressurized fluid is provided to the retract chambers fluid chambers 274 of the first and second hydraulic actuators 202a,202b and piston chambers 289 of the first and second hydraulic locks 204a,204b are at low pressure, with the locking block 295 urged by the biasing spring 296 back into engagement with the locking flange 297.

The use of terminology such as "front," "rear," "top," "bottom," "raised," "lowered," "upwards," and "downwards" throughout the specification and claims is for describing the relative positions of various components of the system and other elements described herein. Similarly, the use of any horizontal or vertical terms to describe elements is for describing relative orientations of the various components of the system and other elements described herein. Unless otherwise stated explicitly, the use of such terminology does not imply a particular position or orientation of the system or any other components relative to the direction of the Earth gravitational force, or the Earth ground surface, or other particular position or orientation that the system other elements may be placed in during operation, manufacturing, and transportation.

A number of embodiments of the invention have been described. Nevertheless, it will be understood that various modifications may be made without departing from the spirit and scope of the inventions.

What is claimed is:

1. A method of operating an aircraft engine thrust reverser comprising a thrust-reversing element movable between a stowed position and a deployed position, the method comprising:
conveying, with a directional control unit, a first activation pressure to at least one hydraulic primary lock to transition the at least one hydraulic primary lock from an engaged state to a released state;
providing a second activation pressure greater than the first activation pressure to the directional control unit to transition the directional control unit from a first stage to a second stage; and
in response to transitioning the directional control unit to the second stage, operating at least one hydraulic actuator to move the thrust-reversing element to the deployed position.

2. The method of claim 1, further comprising applying the first activation pressure to an internal spool valve of the directional control unit, and wherein the first activation pressure is insufficient to overcome a spring force applied to the spool valve by a biasing spring.

3. The method of claim 2, further comprising, prior to applying the first activation pressure to the internal spool valve, operating a solenoid valve of the directional control unit to place a first valve inlet port of the directional control unit in fluid communication with a pilot valve inlet port of the directional control unit.

4. The method of claim 2, wherein providing the second activation pressure to the directional control unit comprising applying the second activation pressure to the internal spool valve, and wherein the second activation pressure is sufficient to overcome the spring force.

5. The method of claim 4, wherein providing the second activation pressure to the spool valve comprises routing pressurized fluid at the second activation pressure through a flow constriction to retard the buildup of hydraulic pressure directed against the spring force.

6. The method of claim 1, wherein conveying the first activation pressure to the at least one hydraulic primary lock comprises simultaneously conveying the first activation pressure to a plurality of redundant hydraulic primary locks, with each of the plurality of redundant hydraulic primary locks being fluidly coupled to the directional control unit in parallel.

7. The method of claim 1, wherein operating the at least one hydraulic actuator comprises conveying, with the directional control unit, pressurized fluid at the second activation pressure to an extend fluid port of the at least one hydraulic actuator.

8. The method of claim 7, wherein operating the at least one hydraulic actuator further comprises: receiving, with the directional control unit, fluid from a retract fluid port of the at least one hydraulic actuator; and recirculating, with the directional control unit, the received fluid to the extend fluid port of the at least one hydraulic actuator.

9. The method of claim 1, wherein conveying the first activation pressure to the at least one hydraulic primary lock comprises conveying the first activation pressure to a fluid port leading to a piston chamber of a lock housing.

10. The method of claim 9, wherein the at least one hydraulic primary lock is transitioned from the engaged state to the released state by urging a spring-biased lock rod to move relative to the lock housing through application of the first activation pressure against a piston sealed in the piston chamber and coupled to the lock rod.

11. The method of claim 9, wherein the fluid port at which the first activation pressure is received is the only fluid port leading to the piston chamber.

12. The method of claim 1, further comprising: energizing an electronic solenoid plunger to move a spring-biased block from a first position, where the at least one hydraulic primary lock is prevented from transitioning from the engaged state to the released state, to a second position, where transitioning of the at least one hydraulic primary lock between the engaged state and the released state is uninhibited.

13. The method of claim 1, wherein the thrust-reversing element is moved to the deployed position by pivoting the element outward away from a nacelle.

14. The method of claim 1, wherein providing the second activation pressure to the directional control unit comprises routing fluid flow from a pressure source to a multi-port electronic isolation valve, and routing fluid flow from the isolation valve to the directional control unit.

15. A method of operating an aircraft engine thrust reverser comprising a thrust-reversing element movable between a stowed position and a deployed position, the method comprising:
conveying, with a directional control unit, a first activation pressure to at least one hydraulic primary lock to transition the at least one hydraulic primary lock from an engaged state to a released state, wherein conveying the first activation pressure to the at least one hydraulic primary lock comprises conveying the first activation pressure to a fluid port leading to a piston chamber of a lock housing, and wherein the at least one hydraulic primary lock is transitioned from the engaged state to the released state by urging a spring-biased lock rod to move relative to the lock housing through application of the first activation pressure against a piston sealed in the piston chamber and coupled to the lock rod;
applying the first activation pressure to an internal spool valve of the directional control unit, wherein the first activation pressure is insufficient to overcome a spring force applied to the spool valve by a biasing spring;
providing a second activation pressure greater than the first activation pressure to the directional control unit to transition the directional control unit from a first stage to a second stage, wherein providing the second activation pressure to the directional control unit comprising applying the second activation pressure to the internal spool valve, and wherein the second activation pressure is sufficient to overcome the spring force; and
in response to transitioning the directional control unit to the second stage, operating at least one hydraulic actuator to move the thrust-reversing element to the deployed position, wherein operating the at least one hydraulic actuator comprises conveying, with the directional control unit, pressurized fluid at the second activation pressure to an extend fluid port of the at least one hydraulic actuator.

16. The method of claim 15, further comprising, prior to applying the first activation pressure to the internal spool valve, operating a solenoid valve of the directional control unit to place a first valve inlet port of the directional control unit in fluid communication with a pilot valve inlet port of the directional control unit.

17. The method of claim 15, wherein operating the at least one hydraulic actuator further comprises: receiving, with the directional control unit, fluid from a retract fluid port of the at least one hydraulic actuator; and recirculating, with the directional control unit, the received fluid to the extend fluid port of the at least one hydraulic actuator.

18. The method of claim 15, wherein providing the second activation pressure to the spool valve comprises routing pressurized fluid at the second activation pressure through a flow constriction to retard the buildup of hydraulic pressure directed against the spring force.

19. The method of claim 15, wherein conveying the first activation pressure to the at least one hydraulic primary lock comprises simultaneously conveying the first activation pressure to a plurality of redundant hydraulic primary locks, with each of the plurality of redundant hydraulic primary locks being fluidly coupled to the directional control unit in parallel.

20. The method of claim 15, further comprising: energizing an electronic solenoid plunger to move a spring-biased block from a first position, where the at least one hydraulic primary lock is prevented from transitioning from the engaged state to the released state, to a second position, where transitioning of the at least one hydraulic primary lock between the engaged state and the released state is uninhibited.

* * * * *